US007685235B2

United States Patent
Curran et al.

(10) Patent No.: US 7,685,235 B2
(45) Date of Patent: Mar. 23, 2010

(54) METHOD AND SYSTEM FOR INTEGRATION OF INSTANT MESSAGING AND TELECONFERENCING VIA A TELEPHONE NETWORK

(75) Inventors: Darragh Curran, Templeogue (IE); Michael Desmond, Mungret (IE); Martin Harrigan, Clonmel (IE); Trevor Johnston, Drogheda (IE); Cenk Kuzucu, IFSC (IE); Mark E. Wallace, Monkstown Avenue (IE)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 10/562,456

(22) PCT Filed: Sep. 27, 2004

(86) PCT No.: PCT/EP2004/052329

§ 371 (c)(1),
(2), (4) Date: Sep. 9, 2008

(87) PCT Pub. No.: WO2005/041086

PCT Pub. Date: May 6, 2005

(65) Prior Publication Data

US 2009/0006555 A1 Jan. 1, 2009

(30) Foreign Application Priority Data

Oct. 17, 2003 (GB) .................................. 0324289.8

(51) Int. Cl.
G06F 15/16 (2006.01)
H04M 3/52 (2006.01)
(52) U.S. Cl. ....................................................... 709/205
(58) Field of Classification Search ................. 709/205; 715/720, 700; 348/14.01; 370/259
See application file for complete search history.

(56) References Cited

U.S. PATENT DOCUMENTS 7,139,379 B2 * 11/2006 Kobrosly et al. ........ 379/202.01
2002/0078150 A1 * 6/2002 Thompson et al. .......... 709/204
2004/0125932 A1 * 7/2004 Orbach et al. .......... 379/202.01

* cited by examiner

*Primary Examiner*—Wing F Chan
*Assistant Examiner*—Ruolei Zong
(74) *Attorney, Agent, or Firm*—Ayla Lari; Hoffman Warnick LLC

(57) ABSTRACT

A system is provided comprising a plurality of instant messaging client applications (202, 207, 208, 209) communicating via a computer network (206) to send and receive messages in real time integrated with n-way teleconferencing capability via a telephone network (216). The system includes a plurality of instant messaging client applications (202, 207, 208, 209), an instant messaging server (204), and a teleconferencing server (210), all connected via a computer network (206). The teleconferencing server (210) enables n-way telephone connections via the telephone network (216). The n-way telephone connections are provided to telephone apparatus of at least some users of the instant messaging client applications who can visualize the teleconference via a graphical user interface (600) of the instant messaging client application.

15 Claims, 10 Drawing Sheets

METHOD AND SYSTEM FOR INTEGRATION OF INSTANT MESSAGING AND TELECONFERENCING VIA A TELEPHONE NETWORK

TECHNICAL FIELD

This invention relates to the field of instant messaging and teleconferencing. In particular, this invention relates to the integration of instant messaging and teleconferencing via a telephone network.

BACKGROUND ART

Instant messaging (IM) enables a user to send and receive messages to and from other users in real time. A first user has a client IM application or software that runs on his computer. When the first user is connected to the Internet, the client IM application opens a connection to an IM server. The client IM application sends a user identification and password to log onto the IM server. The IM server uses a communication protocol that allows for IM functionality.

The client IM application includes a contact list, which is a list of other users that the first user wishes to have the ability to send messages to. When the users identified in the contact list come online and log on to the IM server, the first user is notified so that messages can be sent and received. A message is sent to the IM server, which then routes the message to the identified user. IM applications are used primarily for text based chats, screen sharing, white-boarding and so on.

DISCLOSURE OF INVENTION

This invention relates to the integration of telephony features and conferencing into IM applications. Traditional telephone networks convert sound to electric signals or use wireless communication via radio waves. The widespread telephone network is called the Public Switched Telephone Network (PSTN). Audio telephone conferencing using the PSTN is a long established means of group communication.

In audio teleconferencing, n participants are connected via the PSTN at the same time. Teleconferencing usually requires an audio bridge. An audio bridge has the function of interconnecting multiple telephone channels. A bridge provides smooth voice switching and even distribution of audio signals to all locations and controls transmission quality. Some bridges use a switch that opens a transmission in response to a voice message and other talkers are blocked until the voice message has finished. Other forms of bridge allow more than one talker to be transmitted at the same time. Bridges may have dial-in or dial-out capabilities, which may be handled by an operator or bridging service.

The advantages of this form of group communication are that there is good quality of sound in which the tone of participants' voices can be distinguished and participants can speak spontaneously. Also, use of telephone apparatus is extremely widespread with people having telephones at their places of work, homes as well as mobile telephones.

The disadvantages of telephone conferencing are that a speaker may need to identify himself before speaking and confusion can arise if more than one person talks at the same time. It can also be difficult to notify all the participants of an intended conference and it is time consuming for an organiser of the conference to dial all the appropriate telephone numbers to connect all the participants. This final point is particularly true as people have more than one telephone apparatus usually including a mobile telephone.

Voice over IP (VOIP) or Internet telephony are ways of making a telephone call over the Internet instead of the PSTN. The disadvantage with this form of communication is that the audio is digitised and converted into IP packets. VOIP is typically delivered using RTP (Real time protocol) over UPD (User datagram protocol). At the other end of the call, the digitised voice data is converted back to an audio signal. This conversion can result in unclear and disjointed voice reproduction.

There are three main downfalls of VOIP, namely packet delay, packet loss and jitter. Jitter arises due to variable packet inter-arrival time; some packets take longer than others causing jitter at the receiver. These are caused by the best effort service provided by the Internet protocol (IP).

Some IM applications enable VOIP calls to be set up and integrated with the IM application. This suffers from the limitations of computer to computer VOIP such as quality of sound issues and scalability issues as the conference grows in size. VOIP, especially over the public Internet is still not reliable enough for high quality audio conferences. Another downfall of VOIP computer to computer conferences is that microphone equipment is not as widespread and immediately available to all participants as telephone apparatus.

Some existing IM applications also allow a user who has signed up to a telephone service provider to call another user, setting up a single one to one phone call. This is basic telephone integration but does not provide N way teleconference facilities. Some forms of IM applications can also send SMS (Short Message Service) texts to mobile users.

The invention described here utilizes the high quality and availability of the conventional telephone network and integrates audio teleconferencing into IM applications. The integration of teleconferencing into an IM application involves the merging of teleconferencing on the telephone network with the simplicity and real-time awareness features of IM applications.

According to a first aspect of the present invention there is provided a system comprising a plurality of instant messaging client applications communicating via a computer network to send and receive messages in real time integrated with n-way teleconferencing capability via a telephone network.

In a preferred embodiment, the system comprises: a plurality of instant messaging client applications; an instant messaging server; and a teleconferencing server; all connected via a computer network; wherein the teleconferencing server enables n-way telephone connections via the telephone network.

The teleconference server preferably includes communication means to send notifications to the instant messaging server of the status of telephone connections during a teleconference.

The instant messaging client applications may have graphical user interfaces including means for displaying in real time details of participants of an n-way teleconference and the status of the telephone connections of the participants.

The n-way telephone connections may be to telephone apparatus of users of the instant messaging client applications. An additional telephone connection may also be to a telephone apparatus of a user who is not a user of an instant messaging client application.

The graphical user interface may include means for indicating a participant who is talking at a given time in the teleconference, the means for indicating being activated in response to notification from the teleconference server. The graphical user interface may also include means for a user to input an indication that the user wishes to speak.

The teleconferencing server may use a bridge which interfaces with the telephone network that interprets set up and control commands relating to a teleconference. The teleconference server may allow the system to utilise different network interfaces.

The teleconference server may include an interface allowing an instant messaging client application to set up and control a teleconference. The teleconference server may also include a telephone profile service for retrieving and storing telephone profiles, and a teleconference profile service for managing teleconference profiles including policy information, pin numbers and port allowances.

One of the instant messaging client applications may be a moderator of the teleconference and may have a graphical user interface including control input means for controlling the teleconference.

The graphical user interface may include means for providing a telephone number at which a participant can be connected for the teleconference.

According to a second aspect of the present invention there is provided a method in which a plurality of users each with an instant messaging client application communicate in real time by instant messages via a computer network and can be simultaneously connected by an n-way teleconference via a telephone network.

In a preferred embodiment, the method includes: a plurality of instant messaging applications communicating by instant messages via an instant messaging server on a computer network; and establishing n-way telephone connections via a telephone network using a teleconferencing server on the computer network.

A user of an instant messaging client application may set up and control a teleconference by instant messaging communication with a teleconference server. The user initiating the teleconference may send an instant message in the form of an invitation to proposed participants of the teleconference. Non-users of instant messaging applications may also participate in the n-way teleconference by dialling in themselves or being dialled in by another participant.

The teleconference server may notify the instant messaging server of the status of telephone connections.

The method may include providing graphical user interfaces for the instant messaging client applications including displaying in real time details of participants of an n-way teleconference and the status of telephone connections of the participants. The method may also include activating an indication in the graphical user interface of a participant who is talking at a given time in the teleconference, in response to a notification sent from the teleconference server.

The method may include a user inputting a telephone number in the graphical user interface at which they can be contacted for a proposed teleconference.

According to a third aspect of the present invention there is provided a computer program stored on a computer readable storage medium, comprising computer readable program code means for performing the steps of: providing an instant messaging client application for communicating with other instant messaging client applications by instant messages delivered via an instant messaging server on a computer network; the instant messaging client application having an extension for enabling teleconferencing using a teleconferencing server on the computer network enabling n-way telephone connections via the telephone network.

According to a fourth aspect of the present invention there is provided a computer program stored on a computer readable storage medium, comprising computer readable program code means for performing the steps of: providing a plurality of instant messaging applications (202, 207, 208, 209) communicating by instant messages via an instant messaging server (204) on a computer network (206); and establishing n-way telephone connections via a telephone network (216) using a teleconferencing server (210) on the computer network (206).

Using the integration of teleconferencing with instant messaging, users are capable of initiating audio teleconferences using their IM application with the same semantics as those in n-way text chats.

This invention expands the scope of the IM applications into the domain of teleconferencing on the telephone network and introduces a host of new possibilities. Teleconferences can be set up and destroyed in an adhoc manner in real time as easily as text chats. The telephony status within an IM community can be communicated and shown in real time improving telephony awareness.

Another advantage of integration of IM and teleconferencing is concerned with participant experience. The teleconference can be visualized from the IM applications. As contacts are being dialled, pick up, hang up, are dropped, are muted, are speaking this can be graphically displayed to all other participants in the teleconference.

In a regular teleconference, as there is no user interface, only the telephone handset, participant status is not available. With IM integration all participants are capable of viewing the state of all other participants such as who is talking, what their name is and where they are currently located. It is also possible to see external participants and see when participants have picked up their telephone and when they have decided to hang up and leave.

Other very attractive features are awareness of teleconference involvement to other users as well as automatically generated teleconference summaries in terms of contact involvement, time, date and duration.

Another feature is intelligent use of resources, if a moderator invites a number of people to a teleconference and finds that only one has accepted the invitation then the system can downgrade the teleconference to a simple telephone call and thus save on expense.

BRIEF DESCRIPTION OF THE DRAWINGS

Embodiments of the present invention will now be described, by way of examples only, with reference to the accompanying drawings in which.

MODE FOR THE INVENTION

There is described a system in which instant messaging is integrated with teleconferencing via a telephone network.

Figure 1:
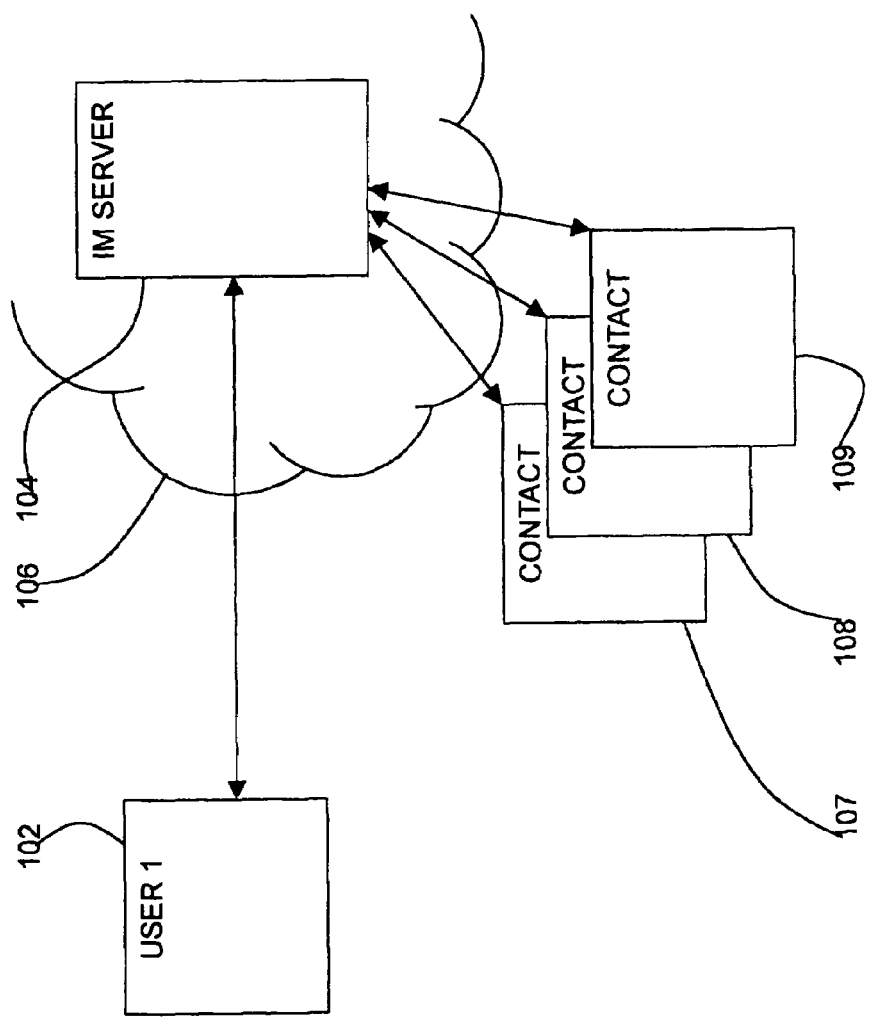
FIG. 1 is a block diagram of an instant messaging system as known in the prior art.

FIG. 1 shows an instant messaging system as known in the prior art. An instant messaging (IM) client application 102 runs on a computer of a first user. An IM service application, also referred to as an IM server 104, provides the IM functionality via a network such as the Internet 106.

When the IM client application 102 logs on to the IM server 104, the server checks a screen name and password. This may be done by a separate login server. The IM server 104 uses a communications protocol that allows for IM functionality. The IM client application 102 has a graphical user interface, which displays the instant messaging functionality.

The IM client application 102 includes contact list capabilities. A list of people the first user would like to send and receive messages to and from is stored in the IM client application 102. This list of the screen names of the contacts is communicated to the IM server 104 so that when the listed people come online, the first user is notified by the IM server 104.

Each contact has its own IM client application 107, 108, 109 which runs on each of their computers. When any of the contacts logs on, the first user's IM client application 102 is notified that they are online. Instant Messages can then be sent and received in real time. Each message goes to the IM server 104, which routes the message to the intended recipient.

Figure 2:
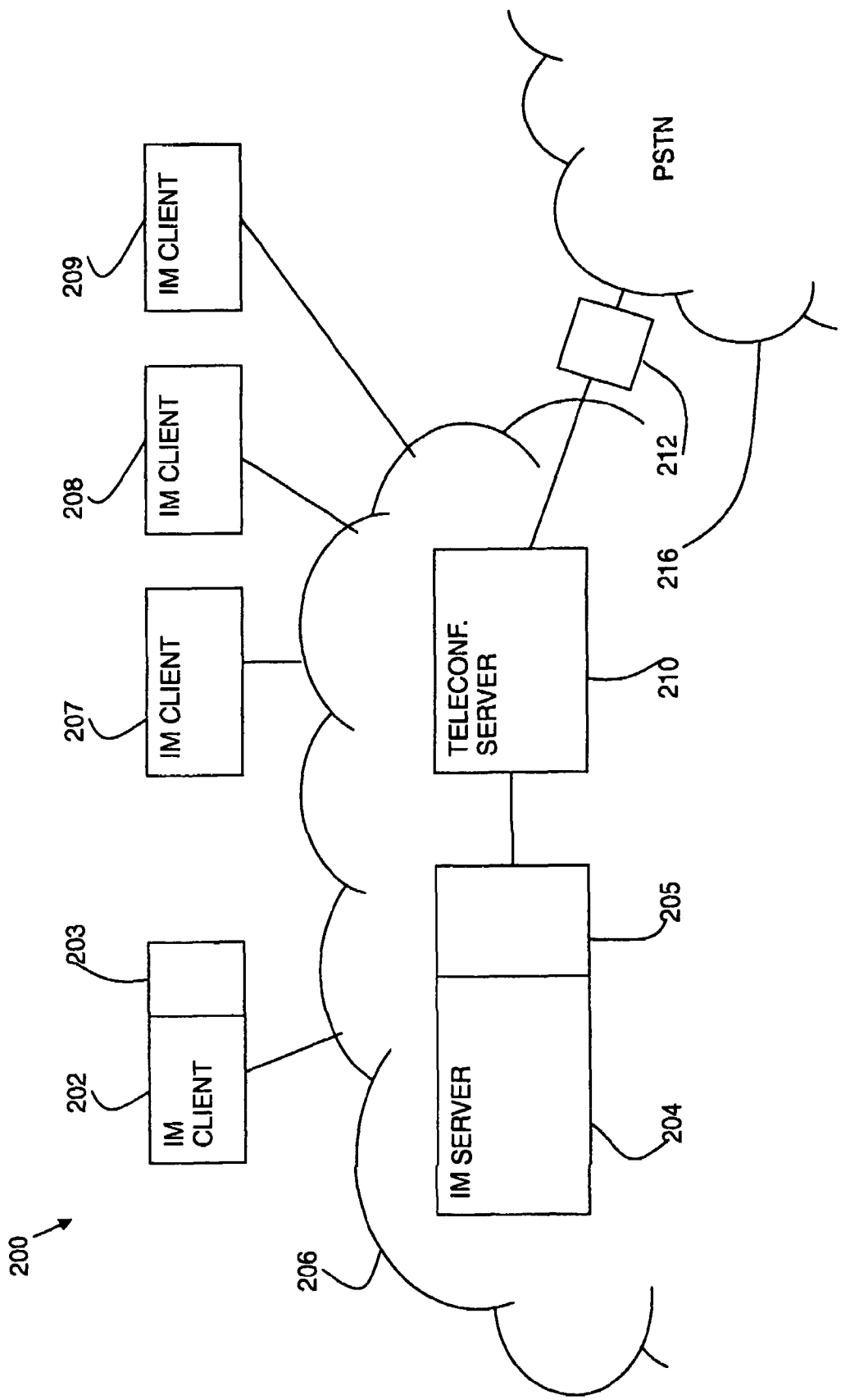
FIG. 2 is a block diagram of a system in accordance with the present invention.

Referring to FIG. 2, a system 200 in accordance with the present invention is shown. A user has an IM client application 202 with an extension 203 that provides teleconferencing functionality. An IM server 204 also has an extension 205 that provides the teleconferencing integration features. Other users each have IM client applications 207, 208, 209 with teleconference extensions (not shown).

Users log on to the IM server 204 as described above in relation to FIG. 1 in order to send and receive instant messages between contacts in real time.

One or more teleconference service application, also referred to as a teleconference server 210, is provided which is the gateway between the IM server 204 and a network interface or an audio bridge 212 connected to a telephone network 216. The teleconference server 210 connects to the IM server 204 and also connects to the network/bridge 212. A teleconference server 210 acts as an interface module for the IM server 204 and the network/bridge 212.

The IM server 204 is first configured to recognise one or more teleconference servers 210, it is irrelevant how this takes place only that the IM server 204 knows that any client requests to setup and control teleconferences go to the teleconference server(s) 210.

The teleconference server 210, on client requests, uses a local conference setup/control interface module to set up and control teleconferences on the PSTN (public switched telephone network) 216. The interface module is a software element with an interface that implements the set up, management, control and destruction of conferences on the telephone network. The conference set up/control interface module provides to the teleconference server 210 a generic interface allowing the set up and control of a teleconference. The importance of this interface module is that the teleconference server 210 can interoperate with different implementations of the conference set up/control interface.

The actual implementation of the conference set up/control interface module can be provided by an audio conferencing bridge 212. The audio conferencing bridge 212 is a device that interfaces with the PSTN 216 possibly using one or more high capacity ISDN connections (e.g. ISDN PRI (Primary rate)). The audio conferencing bridge 212, at a basic functional level, is capable of setting up connections on the PSTN 216 and mixing the sound incoming on a number of connections and transmitting the mixed sound back out on the same connections (i.e. conferencing).

The bridge 212 can also be dialled using a telephone handset and a user can create or join a conference by inputting a valid pin number. The audio conferencing bridge 212 interprets messages from the teleconference server 210 relating to conference set up and control and provides feedback on conference state to the teleconference server 210. This messaging and feedback takes place via the conference set up/control interface module running on the teleconference server 210. In this scenario, the bridge 212 can be considered as implementing the network interface.

Another possible implementation of the conference set up/control interface which allows the teleconference server 210 to set up conferences could use one of the emerging network API's such as Parlay (trade mark of The Parlay Group). Parlay is an interface that is designed for use by applications which rely the on the telecoms network. Parlay has provisions for conferencing where implemented in the network. The teleconference server 210 could communicate with a Parlay gateway via the conference set up/control interface for access to the network. The scenario above requires a network that implements the Parlay interface.

Along with allowing the set up and control of conferences the teleconference server 210 also uses the services of the IM server 204 to communicate the real time state of the conference to the participating clients 202, 207, 208, 209. This is accomplished by interpreting and processing feedback from the conference set up/control module.

The teleconference server 210 is used to set up telephone connections via a telephone network 216 such as the PSTN with each participant of a teleconference. A teleconference can then be carried out between participants simultaneously with the running of IM client applications by the participants.

Each of the IM client applications 202, 207, 208, 209 with teleconferencing extensions can also communicate directly with the teleconference server 210. The teleconferencing server 210 allows IM users to set up and control a teleconference as a moderator and also allows IM users who have been invited to a teleconference to take part as a participant.

Notifications regarding the setting up and status of telephone connections with each of the participants of a teleconference are sent by the teleconference server 210 to the IM server 204. The IM server 204 notifies the IM client applications 202, 207, 208, 209 of the teleconference participants of the status of the telephone connections.

Each of the IM client applications 202, 207, 208, 209 has a graphical user interface with added functionality for teleconferencing. The graphical user interface displays information relating to the teleconference and the status of each participant's telephone connection as shown further below. The extension 205 of the IM server 204 which provides the teleconference integration features updates the information displayed by the graphical user interfaces of the IM client applications.

Figure 3:
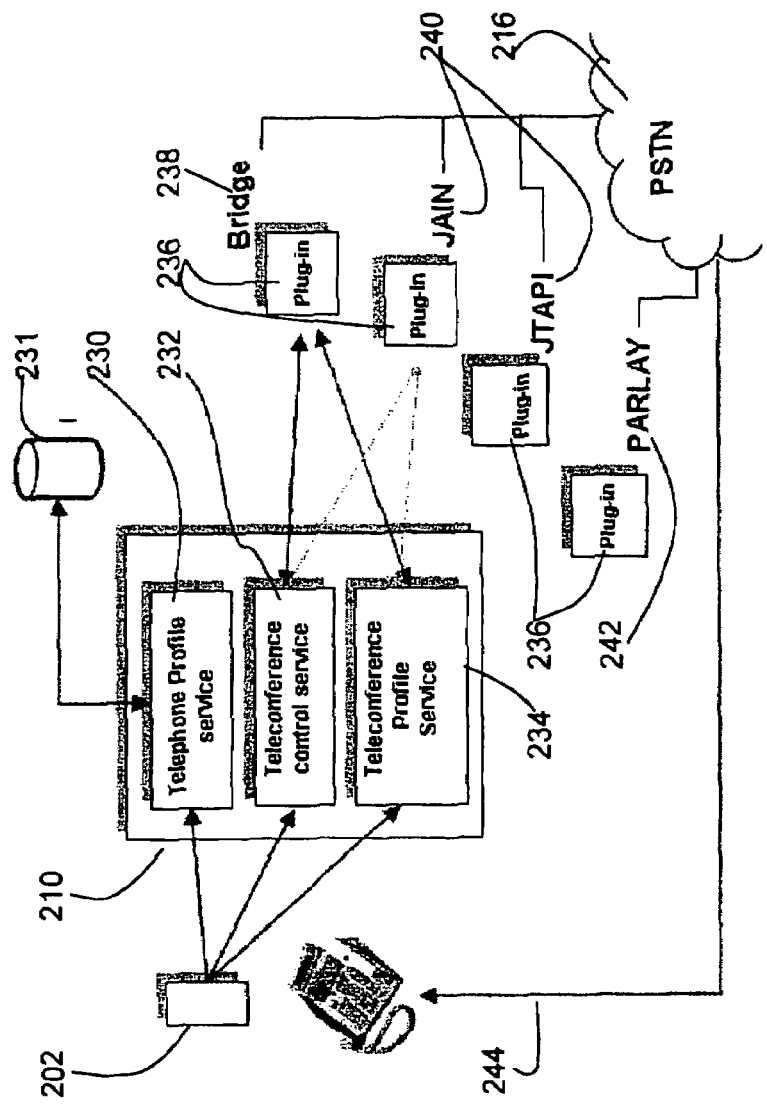
FIG. 3 is a block diagram of the teleconference server of the system of FIG. 2.

FIG. 3 shows the functionality of the teleconference server 210 in more detail. The teleconference server 210 provides a telephone profile service 230 which retrieves and stores the IM users' telephone profiles from a directory 231. The teleconference server 210 also provides an interface 232 allowing IM users to set up and control teleconferences as moderators and also allows IM users who have been invited to a teleconference to take part as a participant. The teleconference server 210 also manages teleconference profiles 234 such as policy information, pin number, port allowance and so on.

To interface with the telephone network 216, in order to setup and manage telephone connections, the teleconference server 210 uses a network interface plug-in 236 that interprets standard setup and control commands relating to audio teleconferences. The plug-in architecture 236 allows the system to utilize a number of different network interfaces such as an audio conferencing bridge 238, a Java (trade mark of Sun Microsystems, Inc.) based network API 240 (JAIN (Java APIs for Intelligent Networks) and JTAPI (Java Telephony API)), or other network interfaces 242 such as the Parlay interface. The teleconference server 210 sets up a telephone connection 244 to each participant via the audio bridge or the network API implementation.

The following is a description of the user experience of the described system including screen shots of examples of graphical user interfaces which could be used. An initiator of a teleconference sets up a teleconference and invites other participants to the teleconference. A moderator controls the teleconference. The initiator and the moderator may often be the same user. However, the moderator can change during the course of a teleconference, if required.

Figure 4:
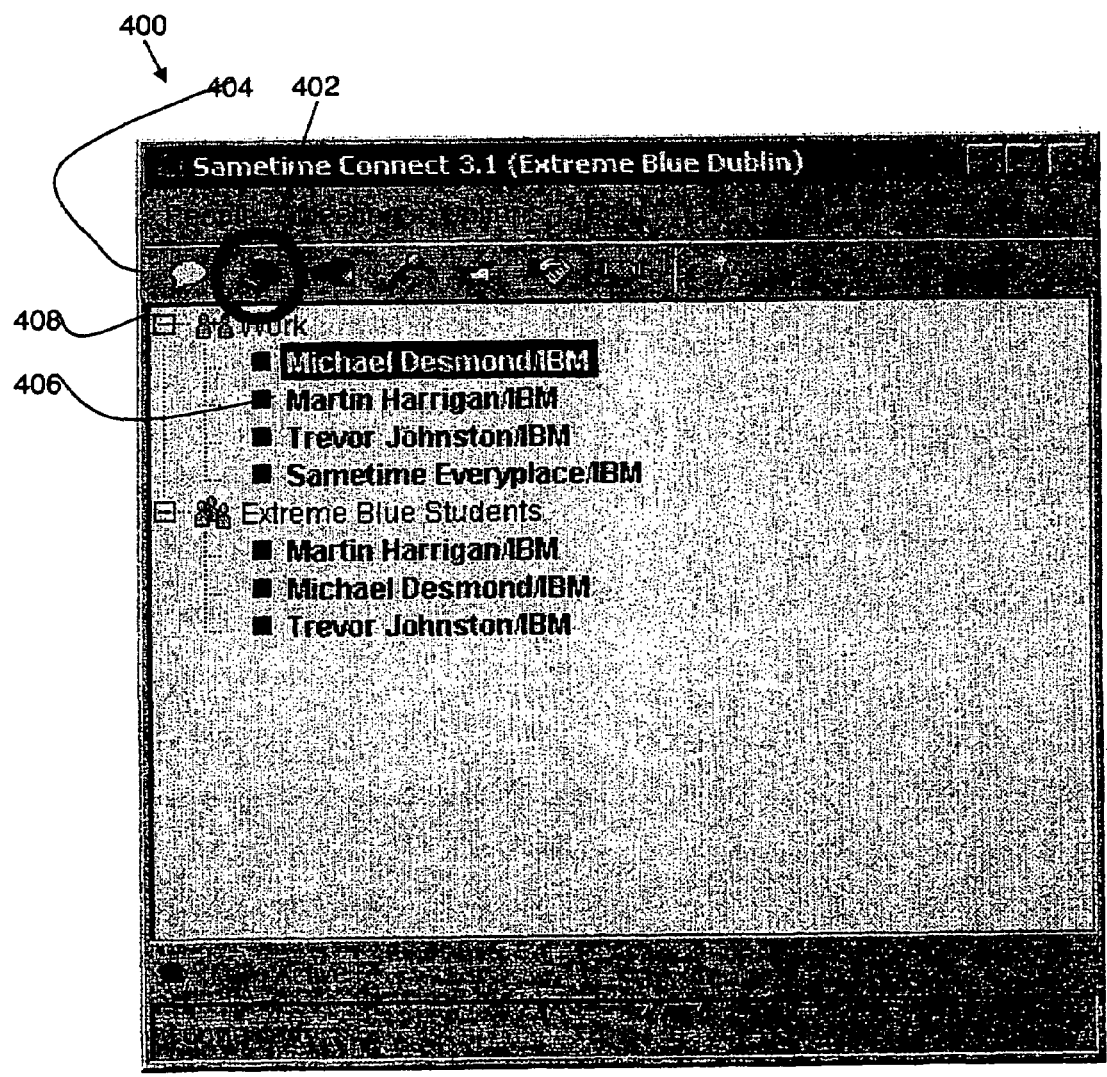
FIG. 4 is a screen shot of an instant messaging graphical user interface in accordance with the present invention.

The user of the IM client application 202 is presented with the usual IM graphical user interface (GUI) 400 as shown in FIG. 4. In a teleconference integrated IM client application 202, there is an extension allowing the user access to teleconference functionality. For example, this is illustrated by the telephone icon 402 circled in the toolbar 404.

Figure 5A:
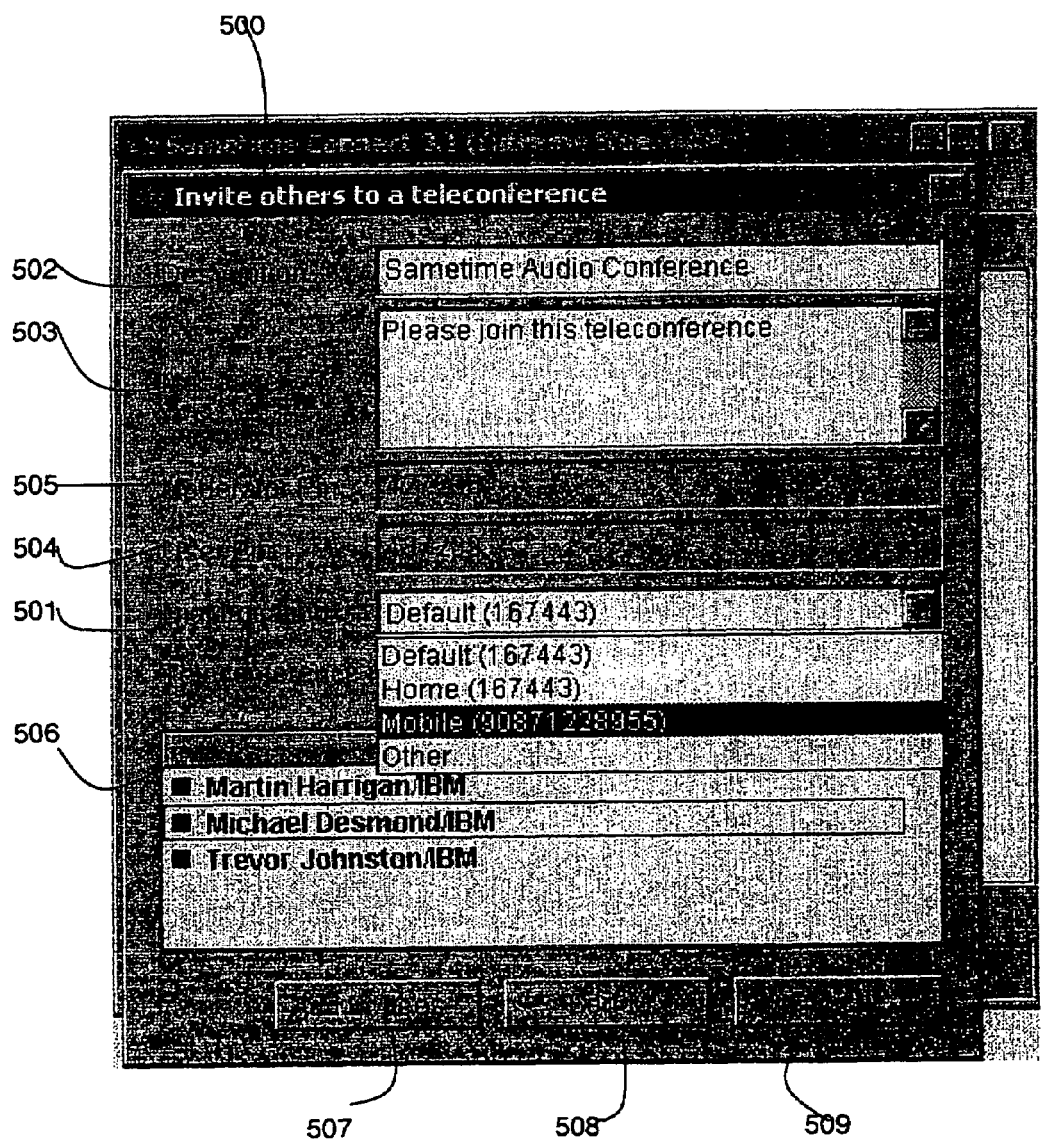
FIGS. 5A and 5B are screen shots of a teleconference set up dialog box and invitation as extensions to the instant messaging graphical user interface of FIG. 4.

The user can click on a number of IM contacts 406 in their contact list 408 and click on the telephone icon 402 to begin an audio teleconference between the selected contacts. When the user does this, he is presented with a teleconference setup dialog box 500 as shown in FIG. 5A.

In the teleconference setup dialog box 500, the user who is initiating the teleconference can select the location 501 at which he would like to be dialled when the teleconference begins. The initiating user can also enter the description of the teleconference 502 and a message 503 to be sent to the intended participants. The user has a password or personal identification number (PIN) as a user 504 and as the moderator 505 of the teleconference.

The user can add invitees by clicking on the "Add Invitees" button 507. A list 506 shows the invitees currently selected. When the user is satisfied with the list of invitees, he can send the invitations by clicking on the "Send" button 508. A "Cancel" button 509 is also provided.

Figure 5B:
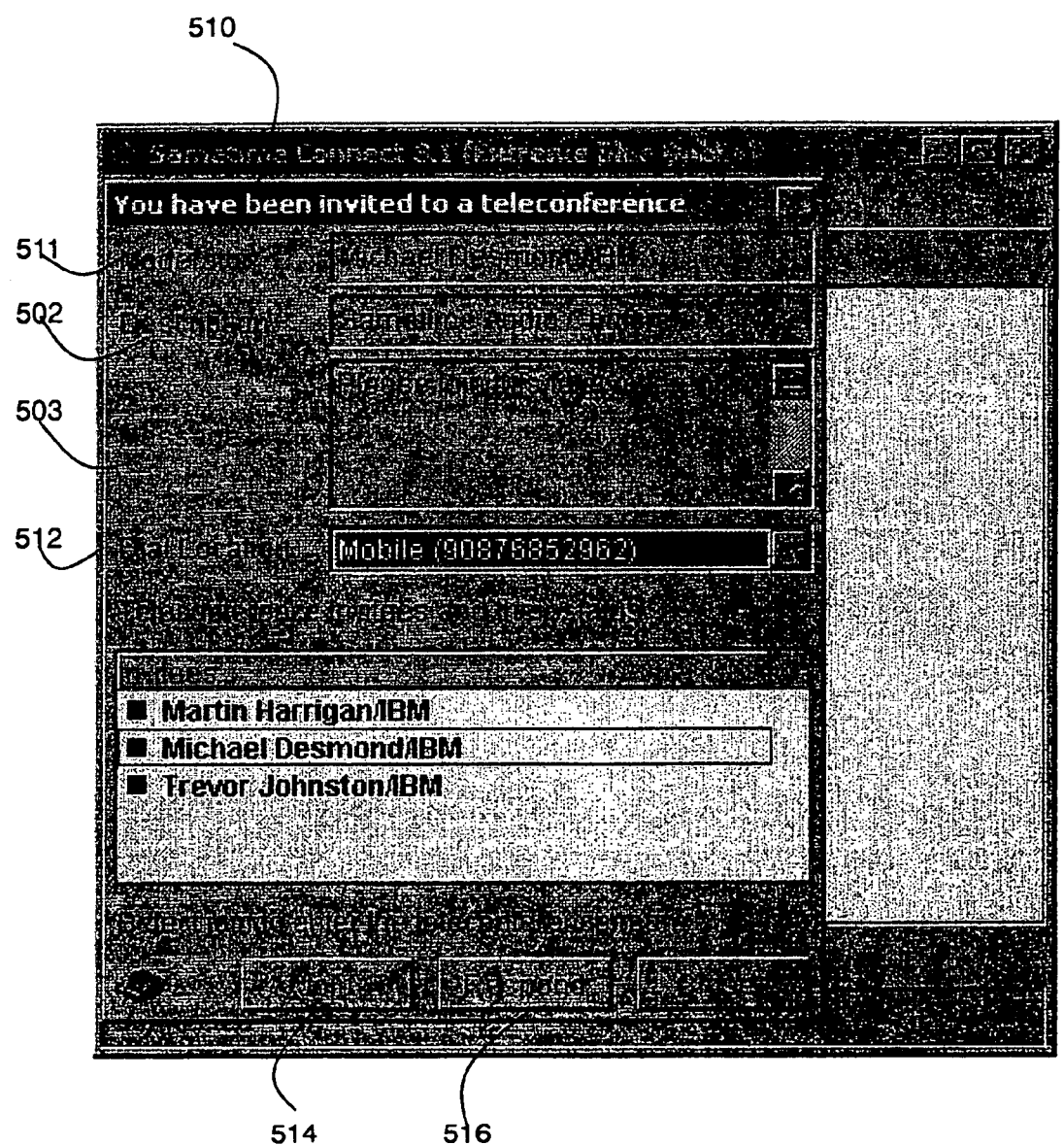

When the "Send" button 508 is clicked, invitations 510 to the teleconference are sent to the intended participants. An invitation 510 in the form of a dialog box is shown in FIG. 5B. The invitation 510 includes details of the moderator 511 and the description 502 and the message 503 as provided by the moderator.

The intended participant has the option to either accept or reject the invitation to the teleconference. If the participant accepts the invitation, he must choose one of his pre-configured telephone locations 512 at which he wishes to be dialled. Alternatively, he may enter a new telephone number in the dial location 512.

The invitation 510 also shows the other invitees 513 and their status as they respond to the invitation. The status of the invitees is sent and received via the IM client applications and IM server in real time as the invitees respond. A button 514 is provided on the invitation 510 to join the teleconference. A button 516 is also provided to respond to the invitation.

Once a participant has accepted the invitation and joined the teleconference, he is presented with a view of the teleconference in the form of a teleconference GUI 600 shown in FIGS. 6A to 6D.

The moderator who initiated the teleconference is presented with a more featured view of the teleconference GUI 600. Both views show as participants 601 join the teleconference and their status 602. The moderator of the teleconference is shown by a key 609 next to his name.

In the moderator's view of the teleconference GUI 600, there are various call control options such as mute 603, drop 604, invite 605 and invite external users 606. The whistle icon 607 entitled "moderator" is provided to allow the moderator to pass moderator rights to others. The participants' view is identical to the moderator's view except that they do not have the conference control toolbar. The teleconference GUI 600 includes input buttons for indicating a gesture 610 such as raising a hand.

When the teleconference starts, the moderator is dialled at their chosen number and all those who accepted the invitation are also dialled at their chosen numbers by the teleconference server. Once the participants are connected by telephone, the user currently speaking is depicted by an icon with the talking animation 608. Notifications of who is speaking and call status is sent from the teleconference server to the IM server which sends the instant messages to the IM client applications which show the status graphically in the teleconference GUI 600.

Figure 6A:
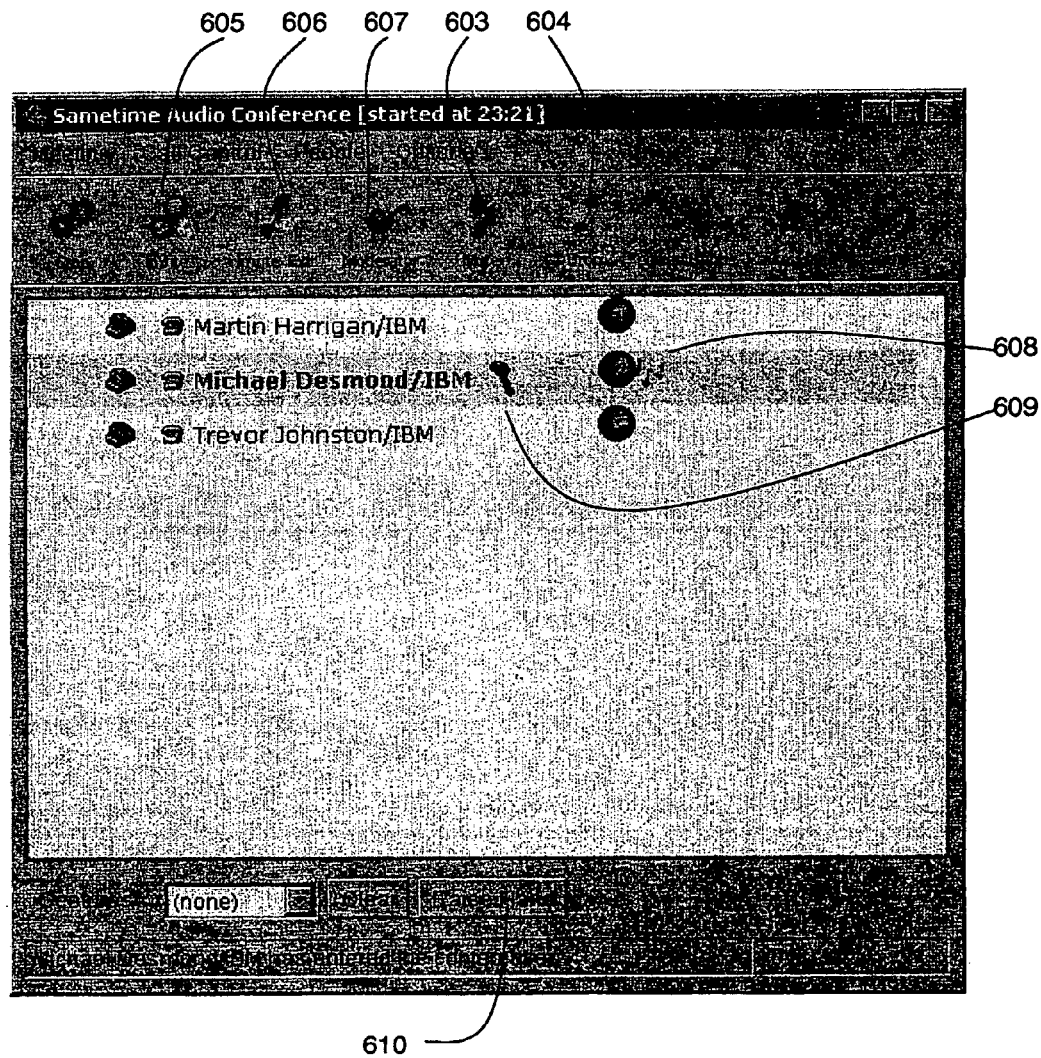
FIGS. 6A to 6D are screen shots of a teleconference graphical user interface in accordance with the present invention.
Figure 6B:
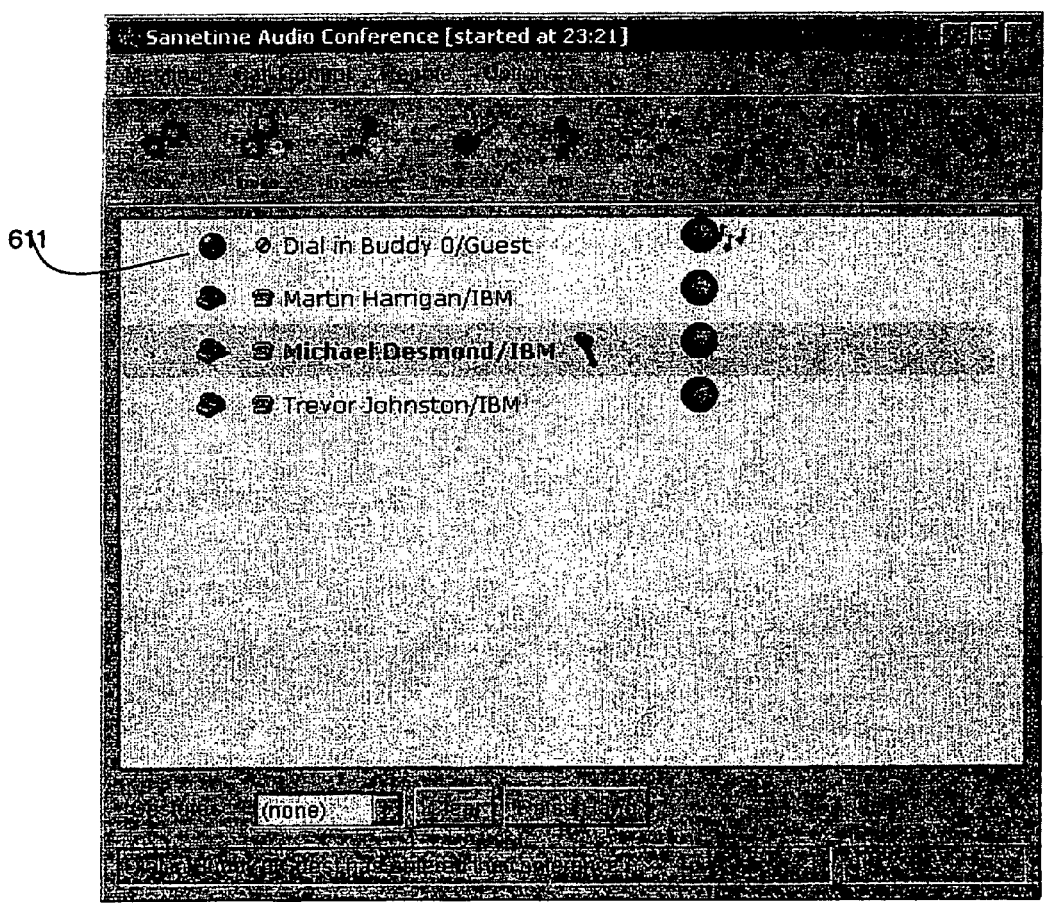

FIG. 6B depicts the entrance of a dial in participant to the teleconference depicted by the globe icon 611. The dial in contact does not have an IM profile and this is a guest.

Figure 6C:
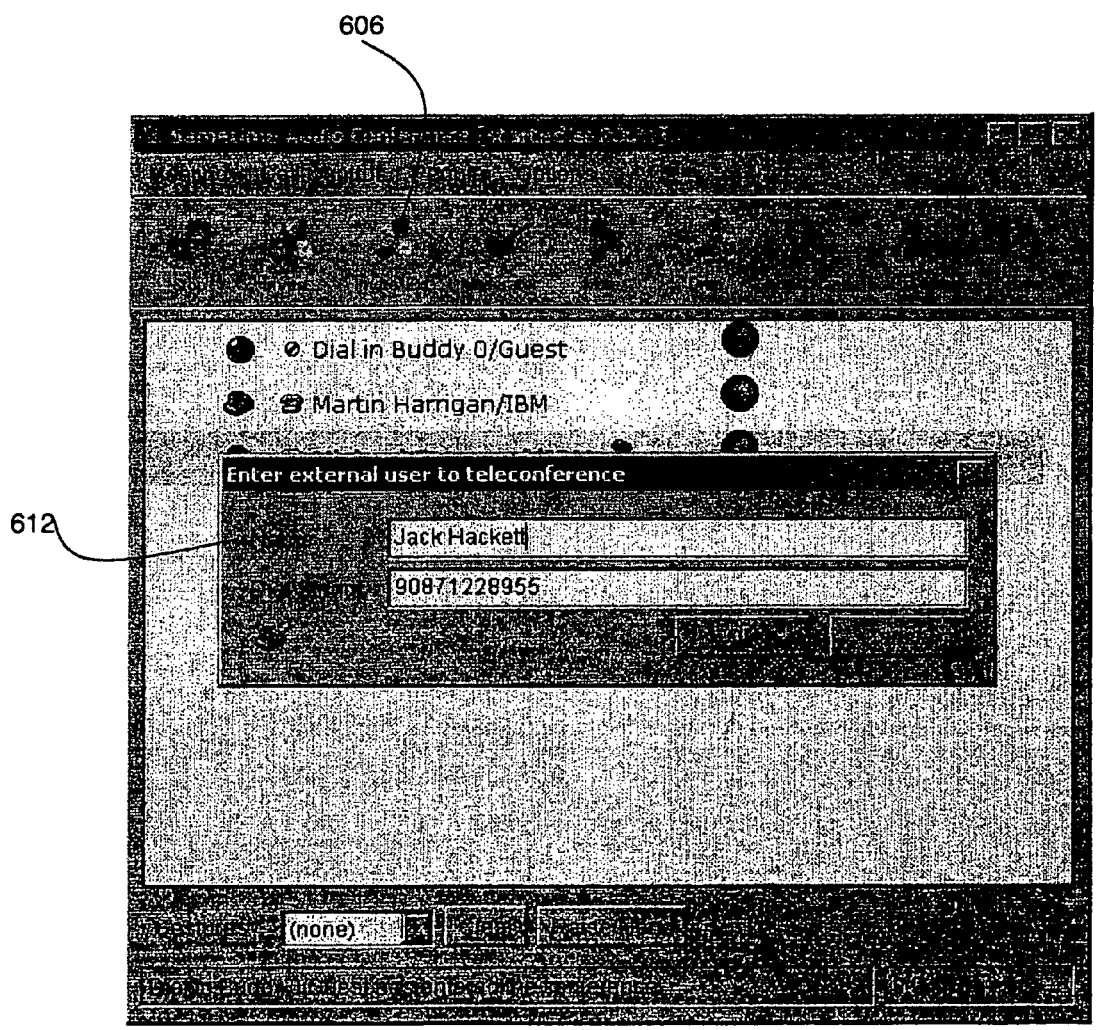

As well as dial in, the moderator can dial out external users, who are not IM users, into the teleconference. This is shown in FIG. 6C. By selecting the "invite ext" option 606, the moderator can select someone to dial out into the teleconference. A dialog box 612 is displayed to the moderator in which the moderator can input the details of the invitee.

Figure 6D:
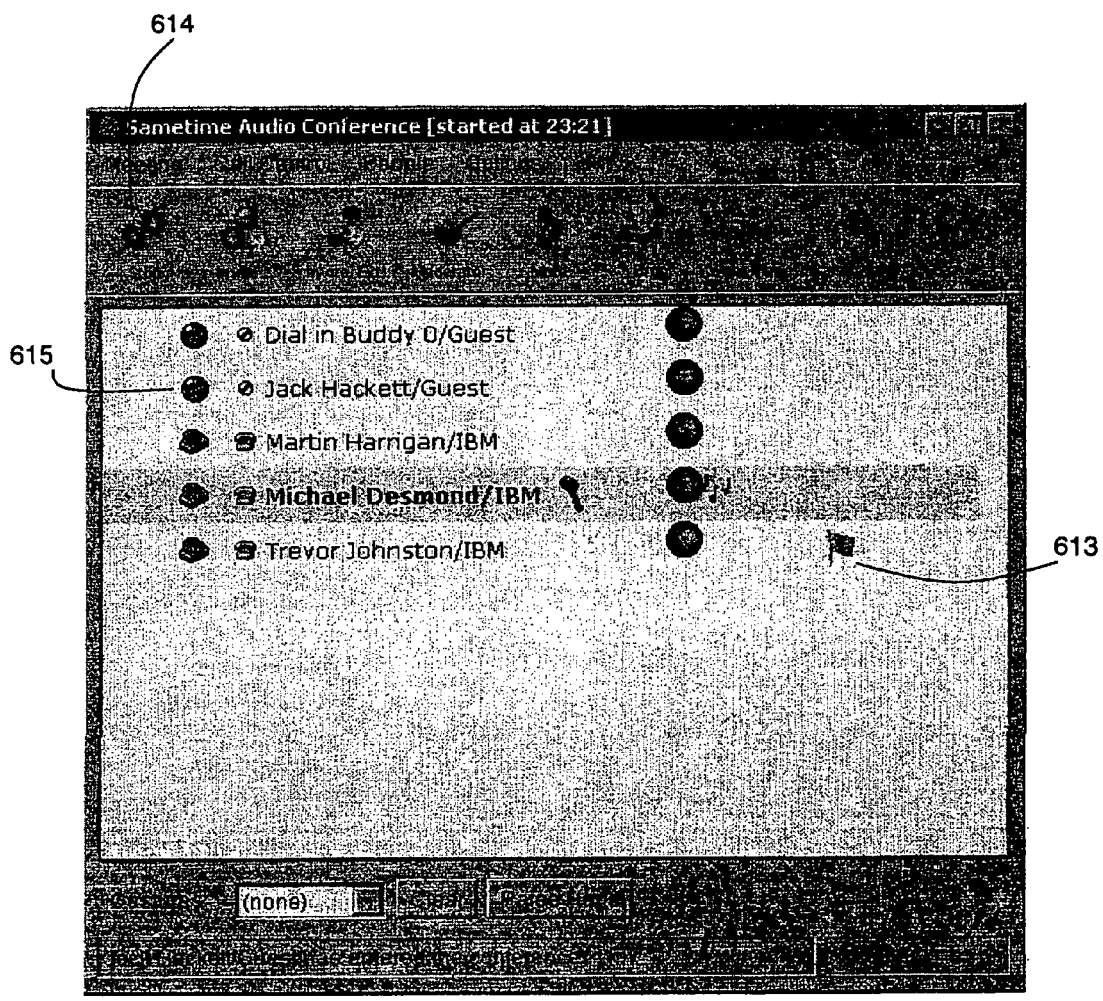

FIG. 6D shows that the external user has been dialled out and is now in the teleconference 615. This figure also shows that one of the participants is signalling to speak as he has raised his flag 613.

Along with the features described above, the system notifies users when a participant picks up and hangs up from the teleconference. When a participant hangs up, his name is ghosted out and his icons disappear. The moderator can stop the teleconference at any time by selecting stop 614.

A general description of the use of the system integrating instant messaging and teleconferencing is now provided. An IM client application user is able to set up an audio teleconference with a number of his contacts from his IM client application interface. A teleconference is started when the IM user selects a number of IM contacts and indicates via his interface that he wishes to start a teleconference. The contacts receive invitations to the teleconference and can choose to accept at any of a number of preconfigured telephone "locations" such a home, office, mobile or define new locations as required. A location is made up of a telephone number and a descriptor such as (087-xxxxxxx Mobile). Using this feature a user need not constantly be dialling telephone numbers.

Once participants accept the invitation to the teleconference at their selected location they receive a graphical description of the teleconference. The user who initiated the teleconference is designated the moderator of the conference unless the user indicates otherwise. The moderator can view the status of the teleconference from his IM client application and, once satisfied that enough members are present, he can start the teleconference by selecting start from the graphical user interface.

Starting the teleconference involves the teleconference server dialling all users in the teleconference using their selected telephone locations. Once the IM users participating in a teleconference are physically dialled into the teleconference the instant messaging application visualizes their real time state changes on the telephone network. Notification of any status change on the telephone network is sent by the teleconference server to the IM server and this is graphically illustrated in the user interfaces of the IM client applications in real time. As participants pick up their telephone their virtual state is graphically changed, if they speak this is also signalled by state change which is visible to all participants involved in the call.

For participants wishing to dial into a teleconference who are not instant messaging users there are two scenarios. The moderator can dial out a user using the teleconference control graphical user interface. Alternatively, the participant can dial into an ongoing teleconference. Either way the user is represented as a guest in the teleconference visual dialog and inherits the same state as other participants which can be visualized by all other participants.

During an ongoing teleconference, IM users can be invited and can join into the ongoing teleconference. Once they accept the invitation, they receive the teleconference graphical user interface component and are dialled into teleconference.

Visual teleconference state is augmented by participant to participant signalling. Participants can signal one another using simple 2 or even n-way text chats using the IM applications. Along with text chats, users can also graphically signal to one another in the teleconference. Participants can raise their virtual hand to signal to the moderator that they wish to speak; they can also get in line to speak; and also signal that they are away for a moment. This is all done using the IM application extension that provides such real time awareness.

Throughout the teleconference, there is a moderator who has, in addition to the graphical display of the teleconference, a teleconference control graphical user interface component implementing call control. The moderator using his IM client application is capable of muting, un-muting, dropping, dialling and implementing other call control features on participants. The moderator can also control the conference itself from the GUI such as sidelining participants into sub-conferences, locking the conference, dialling out external users, recording the conference and so on.

A related point on moderator rights is transferral. With integration of instant messaging into teleconferencing users are capable of transferring moderator rights to other participants. If the moderator must leave the teleconference, instead of leaving an idle telephone picked up or off hook, so as to not destroy the teleconference, the moderator can pass moderator rights to a trusted contact and leave the teleconference.

To end an IM integrated teleconference the moderator can choose to stop the conference in which all participants are hung up. The moderator can also choose to drop a number of participants or single participants from their teleconference contact list. If all participants hang up the teleconference will also be terminated.

Commonly in teleconferences a number of participants dial in from a single location, perhaps a conference room with a speaker phone. To accommodate this feature the system represents users with the same dial location (physical telephone) as a group in the teleconference. The group has attributes such as muted and when a single person in the group speaks the teleconference GUI signals that speech is taking place within the group.

Integration allows teleconference metrics to be collated by the IM application such as who is or was talking the most, number of participants, length of the conference, talk time as opposed to silence, and so on. These metrics can be visualized in real time graphs or bar charts during and after the teleconference.

Finally, during an ongoing teleconference other users in the IM community can be made aware of the fact that a user is in teleconference by showing "in teleconference" status as well as the phone location being used. This means that they may be available for chat but may not want to be invited to another teleconference until they are finished their current teleconference. This allows other users to make informed decisions about contacting an engaged user.

Parts of the present invention are typically implemented as computer program products, comprising a set of program instructions for controlling a computer of similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A system comprising:
    an instant messaging server and a plurality of instant messaging client applications, communicating via a computer network to send and receive instant messages in real time, integrated with n-way teleconferencing capability via a telephone network;
    a teleconferencing server for enabling a teleconference between n-way telephone connections via the telephone network, each telephone connection associated with a participant of the teleconference, and for sending to the instant messaging server: a notification of a status of the telephone connection of each participant of the teleconference; and an indication of a participant in the teleconference who is speaking at a given time;
    each instant messaging client application including a graphical user interface comprising: a system for indicating to the instant messaging server that a participant wishes to sneak in the teleconference; and a system for displaying information received via one or more instant message from the instant messaging server: details of each participant in the teleconference; and a status of the telephone connection of each participant in the teleconference.

2. A system as claimed in claim 1, wherein the n-way telephone connections are to telephone apparatus of users of the instant messaging client applications.

3. A system as claimed in claim 2, wherein an additional telephone connection is to a telephone apparatus of a user who is not a user of an instant messaging client application.

4. A system as claimed in claim 1, wherein the teleconferencing server uses a bridge which interfaces with the telephone network that interprets set up and control commands relating to a teleconference.

5. A system as claimed in claim 4, wherein the teleconference server allows the system to utilise different network interfaces.

6. A system as claimed in claim 1, wherein the teleconference server includes an interface allowing an instant messaging client application to set up and control a teleconference.

7. A system as claimed in claim 1, wherein the teleconference server includes a telephone profile service for retrieving and storing telephone profiles, and a teleconference profile service for managing teleconference profiles including policy information, pin numbers and port allowances.

8. A system as claimed in claim 1, wherein one of the instant messaging client applications is a moderator of the teleconference and has a graphical user interface including control input means for controlling the teleconference.

9. A system as claimed in claim 1, wherein the graphical user interface includes means for providing a telephone number at which a participant can be connected for the teleconference.

10. A method, comprising:
- a plurality of users each with an instant messaging client application communicating in real time by instant messages via an instant messaging server and a computer network and simultaneously connected by an n-way teleconference via a telephone network;
- enabling a teleconference between n-way telephone connections via a teleconferencing server and the telephone network, each telephone connection associated with a participant of the teleconference;
- sending from the teleconference server to the instant messaging server: a notification of a status of the telephone connection of each participant of the teleconference; and an indication of a participant in the teleconference who is speaking at a given time;
- each instant messaging client application:
- indicating to the instant messaging server, via a graphical user interface, that a participant wishes to sneak in the teleconference; and displaying, via the graphical user interface, information received via one or more instant message from the instant messaging server: details of each participant in the teleconference; and a status of the telephone connection of each participant in the teleconference.

11. A method as claimed in claim 10, wherein a user of an instant messaging client application sets up and controls a teleconference by instant messaging communication with a teleconference server.

12. A method as claimed in claim 11, wherein the user initiating the teleconference sends an instant message in the form of an invitation to proposed participants of the teleconference.

13. A method as claimed in claim 10, wherein non-users of instant messaging applications can also participate in the n-way teleconference by dialling in themselves or being dialled in by another participant.

14. A method as claimed in claim 10, wherein the method includes a user inputting a telephone number in the graphical user interface at which they can be contacted for a proposed teleconference.

15. A computer program stored on a computer readable storage medium, comprising computer readable program code means for performing the method of claim 10.

* * * * *